(12) United States Patent
Hunter

(10) Patent No.: US 8,620,102 B2
(45) Date of Patent: *Dec. 31, 2013

(54) METHODS, APPARATUSES AND SYSTEMS FOR PIECEWISE GENERATION OF PIXEL CORRECTION VALUES FOR IMAGE PROCESSING

(75) Inventor: Gregory Michael Hunter, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 105 days.

This patent is subject to a terminal disclaimer.

(21) Appl. No.: 13/214,026

(22) Filed: Aug. 19, 2011

(65) Prior Publication Data

US 2011/0298943 A1   Dec. 8, 2011

Related U.S. Application Data

(63) Continuation of application No. 11/798,282, filed on May 11, 2007, now Pat. No. 8,078,001.

(51) Int. Cl.
*G06K 9/40* (2006.01)

(52) U.S. Cl.
USPC .......................................................... 382/274

(58) Field of Classification Search
USPC .................. 382/260, 274; 348/241–251
See application file for complete search history.

(56) References Cited

U.S. PATENT DOCUMENTS

| | | | |
|---|---|---|---|
| 5,272,536 A | 12/1993 | Sudo et al. | |
| 5,282,023 A * | 1/1994 | Scarpa | 348/624 |
| 5,325,188 A * | 6/1994 | Scarpa | 348/624 |
| 5,400,084 A * | 3/1995 | Scarpa | 348/624 |
| 5,493,334 A | 2/1996 | Zortea et al. | |
| 6,094,221 A | 7/2000 | Andersion | |
| 6,734,905 B2 | 5/2004 | Fossum et al. | |
| 6,738,057 B1 * | 5/2004 | Campbell | 345/611 |
| 6,747,757 B1 * | 6/2004 | Enomoto | 358/1.9 |
| 6,912,307 B2 | 6/2005 | Spitzer et al. | |
| 6,937,777 B2 | 8/2005 | Shirakawa | |
| 7,016,550 B2 * | 3/2006 | Alderson et al. | 382/274 |
| 7,088,388 B2 * | 8/2006 | MacLean et al. | 348/234 |
| 7,151,560 B2 * | 12/2006 | Matherson et al. | 348/187 |
| 7,391,450 B2 | 6/2008 | Pinto et al. | |
| 7,420,623 B2 * | 9/2008 | Nakakuki | 348/625 |
| 7,538,806 B2 * | 5/2009 | Kawakami et al. | 348/251 |
| 7,692,144 B2 * | 4/2010 | Watanabe et al. | 250/307 |
| 7,782,380 B2 | 8/2010 | Hunter et al. | |
| 7,869,649 B2 * | 1/2011 | Watanabe et al. | 382/162 |
| 8,081,236 B2 * | 12/2011 | Tsuruoka | 348/229.1 |
| 8,089,534 B2 * | 1/2012 | Rao et al. | 348/241 |

(Continued)

OTHER PUBLICATIONS

Manoj Aggarwal et al., "On Cosine-fourth and Vignetting Effects in Real Lenses", 2001 IEEE, pp. 472-479.

(Continued)

*Primary Examiner* — Aaron W Carter
(74) *Attorney, Agent, or Firm* — Dickstein Shapiro LLP

(57) ABSTRACT

Methods, apparatuses and systems providing pixel correction values for a captured image, where the correction values are determined based on a piecewise-quadratic correction function in a first direction. The parameters for the piecewise-quadratic correction function in the first direction are calculated based on a plurality of piecewise-quadratic correction functions in a second direction. The correction values may be positional gain adjustment values.

24 Claims, 4 Drawing Sheets

(56) References Cited

U.S. PATENT DOCUMENTS

| | | |
|---|---|---|
| 8,130,292 B2 * | 3/2012 | Lee .................................. 348/251 |
| 8,194,159 B2 * | 6/2012 | Wang et al. .................... 348/251 |
| 8,331,722 B2 * | 12/2012 | Hunter .......................... 382/274 |
| 8,463,068 B2 * | 6/2013 | Hunter .......................... 382/274 |
| 2002/0094131 A1 | 7/2002 | Shirakawa |
| 2003/0234864 A1 | 12/2003 | Matherson et al. |
| 2003/0234872 A1 | 12/2003 | Matherson et al. |
| 2004/0027451 A1 | 2/2004 | Baker |
| 2004/0032952 A1 | 2/2004 | Pinto et al. |
| 2004/0155970 A1 | 8/2004 | Johannesson et al. |
| 2004/0257454 A1 | 12/2004 | Pinto et al. |
| 2005/0041806 A1 | 2/2005 | Pinto et al. |
| 2005/0053307 A1 | 3/2005 | Nose et al. |
| 2005/0179793 A1 | 8/2005 | Schweng |
| 2005/0190300 A1 * | 9/2005 | Aoki et al. .................... 348/625 |
| 2006/0033005 A1 | 2/2006 | Jerdev et al. |
| 2006/0152630 A1 * | 7/2006 | Miyazawa .................... 348/606 |
| 2007/0025625 A1 | 2/2007 | Burian et al. |
| 2007/0164925 A1 | 7/2007 | Song |
| 2007/0211154 A1 | 9/2007 | Mahmoud |
| 2008/0055446 A1 * | 3/2008 | Hunter et al. .................. 348/308 |
| 2008/0297816 A1 | 12/2008 | Nikkanen et al. |
| 2009/0268053 A1 * | 10/2009 | Wang et al. ................. 348/229.1 |

OTHER PUBLICATIONS

Ian Powell, "Technique employed in the development of antivignetting filters", Opt. Eng. 36 (1) 268-272, Jan. 1997.

Wonpil Yu et al., "Vignetting Distortion Correction Method for High Quality Digital Imaging", Proceeding of the 17th International Conference on Pattern Recognition (ICPR '04).

Wonpil Yu, "Practical Anti-vignetting Methods for Digital Cameras", IEEE Transactions on Consumer Electronics, vol. 50, No. 4, Nov. 2004.

Yin-Pao Chen et al., "An Anti-Vignetting Technique for Super Wide Field of View Mosaicked Images", Journal of Imaging Technology, vol. 12, No. 5, Oct. 1986.

M. Onoe, et al., "Real-Time Shading Corrector for a Television Camera Using a Microprocessor", Real-Time/Parallel Computing, vol. Plenum: NY, pp. 339-346, 1981.

Its'hak Dinstein et al., "Imaging System Response Linearization and Shading Correction", 1984, IEEE, pp. 204-209.

Solene Quelard, "Image Quality Improvement for a CMOS Mobile Phone Digital Camera", Royal Institute of Technology, Feb. 2004, pp. 1-71.

* cited by examiner

| PARAMETER / ROW | $a_{ROW}$ | $b_{ROW}$ | $c_{ROW}$ | $d_{ROW}$ | $e_{ROW}$ | $f_{ROW}$ | $g_{ROW}$ | $h_{ROW}$ | $i_{ROW}$ | $j_{ROW}$ |
|---|---|---|---|---|---|---|---|---|---|---|
| 1 | a1 | b1 | c1 | d1 | e1 | f1 | g1 | h1 | i1 | j1 |
| 2 | a2 | b2 | c2 | d2 | e2 | f2 | g2 | h2 | i2 | j2 |
| 3 | a3 | b3 | c3 | d3 | e3 | f3 | g3 | h3 | i3 | j3 |
| . | . | . | . | . | . | . | . | . | . | . |
| . | . | . | . | . | . | . | . | . | . | . |
| . | . | . | . | . | . | . | . | . | . | . |
| n | $a_n$ | $b_n$ | $c_n$ | $d_n$ | $e_n$ | $f_n$ | $g_n$ | $h_n$ | $i_n$ | $j_n$ |

FIG. 2

METHODS, APPARATUSES AND SYSTEMS FOR PIECEWISE GENERATION OF PIXEL CORRECTION VALUES FOR IMAGE PROCESSING

CROSS-REFERENCE TO RELATED APPLICATIONS

This application is a continuation of U.S. patent application Ser. No. 11/798,282, filed on May 11, 2007, now U.S. Pat. No. 8,078,001, issued on Dec. 13, 2011, the subject matter of which is incorporated in its entirety by reference herein.

FIELD OF THE INVENTION

Embodiments relate generally to pixel value adjustments on images.

BACKGROUND OF THE INVENTION

Imagers, such as for example CCD, CMOS and others, are widely used in imaging applications, for example, in digital still and video cameras.

It is well known that, for a given optical lens, IR filter, housing, etc, comprising a digital still or video camera, the pixels of the pixel array will generally have varying levels of output signal even if the imaged scene is uniform. A camera may have non-uniform pixel response, depending on a pixel's spatial location within the pixel array. One source of such variations is lens shading. Lens shading causes pixels in a pixel array located farther away from the center of the pixel array to have a lower value when compared to pixels located closer to the center of the pixel array, when exposed to the same level of light stimulus. These variations can be compensated for by adjusting, for example, the gain of the pixels based on spatial location in a pixel array. For lens shading correction, for example, it may happen that the further away a pixel is from the center of the pixel array, the more gain is needed to be applied to the pixel value. Different color channels of an imager may also be affected differently by varying lens shading patterns.

In addition, sometimes an optical lens is not centered with respect to the optical center of the imager; the effect is that lens shading may not be centered at the center of the imager pixel array. Other types of changes in optical state and variations in lens optics may further contribute to a non-uniform pixel response across the pixel array. For example, variations in iris opening or focus position may affect pixel response.

Variations in the shape and orientation of photo sensors used in the pixels may also contribute to a non-uniform spatial response across the pixel array. Further, spatial non-uniformity may be caused by optical crosstalk or other interactions among pixels in a pixel array.

Sometimes response variations caused by the spatial position of a pixel in a pixel array can be measured, and the pixel response value can be corrected with an adjustment. Lens shading, for example, can be corrected using a set of positional gain adjustment values which adjust pixel gain in post-image capture processing of the pixel values. Typically, adjustments across the pixel array can be provided as pixel correction values, one or more corresponding to each of the pixels. The pixel correction values are applied to the pixel values during post-image capture processing to correct for pixel value variations due to the spatial location of the pixels in the pixel array.

Pixel correction values may be determined by correction functions produced from stored function parameters. The pixel correction values dependent upon the pixel's location in the pixel array are used to determine a corrected pixel value, $P(x, y)$. One method of determining a corrected pixel value, $P(x, y)$, is disclosed in co-pending U.S. patent application Ser. No. 10/915,454, entitled CORRECTION OF NON-UNIFORM SENSITIVITY IN AN IMAGE ARRAY, filed on Aug. 11, 2004, ("the '454 application"), which is incorporated herein in its entirety by reference and is briefly described below. Disclosed embodiments provide an alternative method for correcting pixel values using a reduced amount of memory, simplifying processing, allowing the pixel correction values to be more easily calculated in real time, and/or providing a more general correction surface to be generated than in the '454 application.

BRIEF DESCRIPTION OF THE DRAWINGS

FIG. 2 is a table illustrating the parameters for an $Fx(x)$ function for an embodiment disclosed herein.

DETAILED DESCRIPTION OF THE INVENTION

Figure 1:
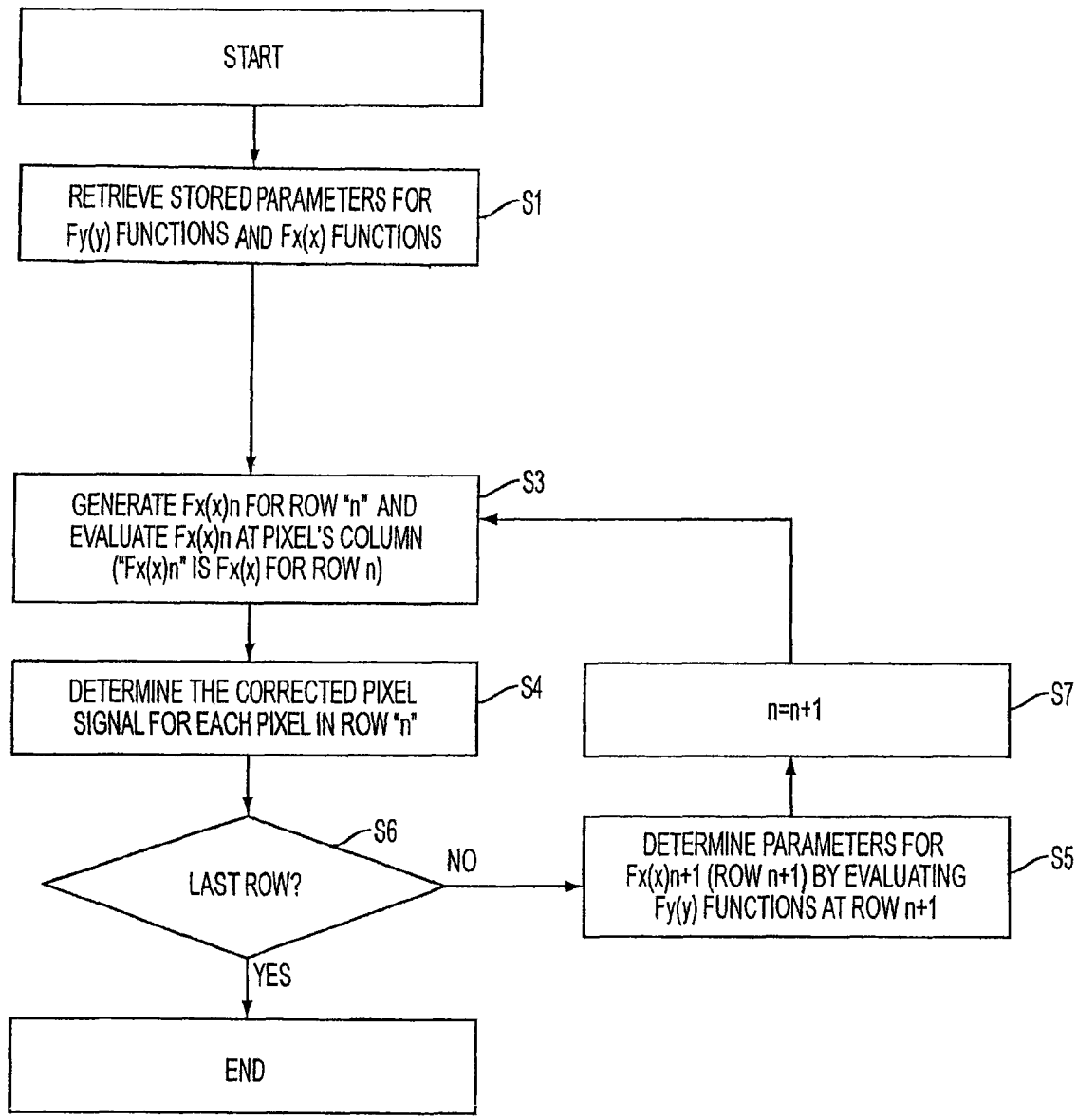
FIG. 1 is a flowchart of the operation of an embodiment disclosed herein.

In the following detailed description, reference is made to the accompanying drawings which form a part hereof, and in which are shown by way of illustration specific embodiments. These embodiments are described in sufficient detail to enable those skilled in the art to make and use them, and it is to be understood that structural, logical or procedural changes may be made. Particularly, in the description below, processes are described by way of flowchart. In some instances, steps which follow other steps may be in reverse, in a different sequence or in parallel, except where a following procedural step requires the presence of a prior procedural step. The disclosed processes may be implemented by an image processing pipeline or other circuit which processes an array of pixel values. The image processing can be implemented using hardware circuits, programmed processors, or a combination of the two.

For purposes of simplifying description, the embodiments are described in connection with performing positional gain adjustment of the pixel values from a captured image to correct for lens shading and other sources. Positional gain adjustment (PGA) refers to the process of compensating for non-uniform responsiveness across pixel positions in a pixel array due, for example, to lens shading, IR-cut filter, etc. However, the embodiments may also be used for any other spatially-varying pixel value corrections such as, for example, pixel crosstalk correction. Embodiments may be used for generating correction surfaces, generally, including surfaces to support image processing operations.

As previously mentioned, one method of determining a corrected pixel value, $P(x, y)$, is disclosed in the '454 application, which is briefly described below. A more complete explanation of the method of the '454 application can be found in the published application, U.S. Patent Application Publication no. 2006/0033005, the disclosure of which is incorporated herein by reference in its entirety.

A corrected pixel value P(x, y) is equal to a readout pixel value $P_{IN}(x, y)$ multiplied by the correction function F(x, y), as shown in Equation (1) below:

$$P(x,y)=P_{IN}(x,y)*F(x,y). \quad (1)$$

The corrected pixel value P(x, y) represents a value of the pixel after correction based on the pixel's location in the pixel array. The readout pixel value $P_{IN}(x, y)$ is the value for the pixel which is acquired by the imager. The location of the pixel in the pixel array is (x, y), where x represents the column in which the pixel is located and y represents the row.

In accordance with the method described in the '454 application, an example of a correction function F(x, y) is represented by the following expression:

$$F(x,y)=Fx(x)+Fy(y)+k_p*Fx(x)*Fy(y)+G, \quad (2)$$

where Fx(x) represents a piecewise-quadratic function in the x-direction, where Fy(y) represents a piecewise-quadratic function in the y-direction, where $k_p*Fx(x)*Fy(y)$ is called a "cross term" and is used to increase/decrease the lens correction values toward the pixel array corners, $k_p$ is referred to as the "cross-term coefficient" or "cross-term coefficient factor," and where G represents a "global" offset (increase or decrease) applied to every pixel in the pixel array, regardless of pixel location. The value of G is typically +1.

During image processor operation, the functions Fx(x) and Fy(y), in Equation (2) above, are determined from parameters which are stored in memory (e.g., registers). In the method of the '454 application, the parameters are stored by "zone" of the pixel array, but they do not change within a given zone. The horizontal zone for Fx(x) is adjusted by x and the vertical zone for Fy(y) is adjusted by y. Different functions Fx(x) and Fy(y) may also be used for each color channel (e.g., red, green, blue) separately to allow for color-channel specific correction. This would usually be done for color applications, as color shading is typical, due to varying patterns of pixel response among the different color channels.

In the method of the '454 application, as each pixel value corresponding to a pixel of an array is read out from the pixel array, the values of each of the piecewise-quadratic functions, Fx(x), Fy(y), corresponding to that pixel are calculated and the value of F(x, y) is determined and then multiplied by the readout pixel value $P_{IN}(x, y)$ (Equation (1)), resulting in the corrected pixel value P(x, y). The cross-term coefficient factors $k_p$ are also pre-stored such that they may be recalled when required. As noted, parameters are stored for each Fx(x) and Fy(y) function and are fixed stored values, used identically within a particular zone.

Embodiments disclosed herein, on the other hand, determine the pixel correction values while generating the Fx(x) parameters in real time for each row and allowing them to differ from one row to the next. Generation of the Fx(x) parameters in real time means that separate parameters for calculating the Fx(x) function are not stored for each row, yet a different Fx(x) may be used for each row, obviating the need for multiplying by Fy(y) while still allowing vertical variations. Additionally, the correction function F(x, y) is simplified by removing the "cross term" multiplication present in Equation (2).

Embodiments disclosed herein may more accurately approximate the ideal, desired correction because they are not limited to only one Fx(x) that is applicable to all rows. At the cost of more memory, a different Fx(x) is generated, row-by-row, yet the pixel-by-pixel and row-by-row calculation of the '454 application is preserved, thereby simplifying calculation. Thus, simpler hardware may be used, than by, for example, copending application Ser. No. 11/512,303, entitled METHOD, APPARATUS, AND SYSTEM PROVIDING POLYNOMIAL BASED CORRECTION OF PIXEL ARRAY OUTPUT, filed Aug. 30, 2006 ("the '303 application"), which is incorporated herein by reference in its entirety. The '303 application typically uses higher order polynomials and more multipliers because Fx(x) is typically evaluated at each pixel from scratch rather than being updated from previous values. Therefore, the present application allows a more accurate approximation of the ideal, desired correction than the '454 application while using less complex hardware than required by the '303 application.

In the embodiments disclosed herein, corrected pixel values P(x, y) are calculated in accordance with Equation (1). The pixel correction function F(x, y) is provided in accordance with Equation (3) below:

$$F(x,y)=Fx(x)+G, \quad (3)$$

where Fx(x) represents a piecewise-quadratic correction function in the x-direction and G represents a "global" offset (increase or decrease) applied to every pixel in the pixel array, regardless of pixel location. As previously stated, the "cross-term" is not included in the calculation of this correction function. The correction function is simplified from that shown in Equation (2) because, in described embodiments, the parameters for the piecewise-quadratic function Fx(x) are generated for each row, in real time, rather than being stored in memory and the same for every row, as in the '454 application which requires the Fy(y) factor for vertical variation, i.e. from one row to another.

The Fx(x) functions are dependent on the particular row in which the pixel is located. By varying this dependence, a correction surface for a pixel array may be generated in accordance with desired vertical variations. While an Fy(y) function is not part of the correction function F(x, y) in Equation (3), in disclosed embodiments, multiple Fy(y) functions are used to generate the parameters for the Fx(x) function for each row, as described below.

The functions Fx(x) and multiple Fy(y)'s are piecewise-quadratic functions in the x and y directions of a pixel array, respectively. Each Fx(x) and Fy(y) is defined by parameters that are used to define the function. For example, parameters for $Fx(x)_{row}$, for a given row number "row", would be $a_{row}$, $b_{row}$, $c_{row}$, $d_{row}$, $e_{row}$, etc. Parameters for $Fy(y)_{parameter}$ are $p_{parameter}$, $q_{parameter}$, $r_{parameter}$, etc. For comparison purposes, in the '454 application, Fx(0) corresponds to $a_{row}$, Fx'(0) corresponds to $b_{row}$, and an Fx" for each horizontal zone corresponds to $c_{row}$, $d_{row}$, $e_{row}$, etc. Similarly, each Fy(y) is a piecewise-quadratic with a Fy(0), Fy(0) and an Fy"(y) for each vertical zone (similar to those described in the '454 application), corresponding to $p_{parameter}$, $q_{parameter}$, $r_{parameter}$, etc. Note that $a_0=p_0$, $b_0=p_1$, $c_0=p_2$, etc. That is, the initial values of the Fy(y)'s, the Fy(0)'s, comprise the parameters of Fx(x) for the first row.

The $a_{row}$, $b_{row}$, $c_{row}$, $d_{row}$, and $e_{row}$, etc. parameters define the Fx(x) function for the particular row, "row," (e.g., the Fx(x) parameters for Row 3 are $a_3$, $b_3$, $c_3$, $d_3$, $e_3$, etc.). The $r_{parameter}$, $q_{parameter}$, and $r_{parameter}$, etc. parameters define the Fy(y) function for a particular parameter, "parameter," of the Fx(x) function (e.g., parameters to determine $b_{row}$ are represented as $p_b$, $q_b$, $r_b$, etc., where $b_{row}$ is the second Fx(x) parameter for row "row"). A separate Fy(y) function describes each of the Fx(x) parameters $a_{row}$, $b_{row}$, $c_{row}$, $d_{row}$, $e_{row}$, etc. For example, $Fy(y)_a$ defines the $a_{row}$ parameter for all the $Fx(x)_{row}$ functions. The $Fy(y)_a$ function is evaluated at a specific row y to determine the value of $a_{row}(a_y)$ for that particular row (y). The parameters for the Fy(y) functions are determined and stored during camera calibration.

In described embodiments, an Fx(x) function is generated for every row y, where y is the row number. The parameters $a_{row}$, $b_{row}$, $c_{row}$, $d_{row}$, and $e_{row}$, etc. are calculated separately for each row rather than retrieved from memory as pre-stored values as in the '454 application. As previously stated, there is an Fy(y) function which represents each separate parameter of the Fx(x) functions. The Fy(y) functions for each of $a_{row}$, $b_{row}$, $c_{row}$, $d_{row}$, and $e_{row}$, etc. for example, are updated for each successive row value, y, to determine the a, b, c, d and e, etc. parameters for that particular row. This allows for the simplification of the correction function, as shown in Equation (3). Since the vertical variation of the resultant surface is not limited to that which may be specified by a single Fy(y), correction surfaces can be generated to fix a greater family of variations in order to better match a desired correction for a given lens, microlens array, IR filter, etc., for a better corrected image.

The process for determining pixel correction values for pixels located in rows zero through N is illustrated in FIG. 1. During initial camera calibration, prior to step S1, parameters $p_{parameter}$, $q_{parameter}$, and $r_{parameter}$, etc. are stored for each Fy(y) function; these include the parameters for the Fx(x) function for the first row (Row 0), $a_0$, $b_0$, $c_0$, etc. At step S1, these stored parameters are retrieved for the Fy(y) functions and the Fx(x) function for the first row. At this point, n is equal to zero.

At step S3, the Fx(x) function is evaluated at each column by being generated, one pixel after another, as in the '454 application. This yields, for each pixel, the value of the function at the specific pixel. At step S4, this value is plugged into the F(x, y) function, as shown in Equation (3) and then is applied, as shown in Equation (1), to the readout pixel value $P_{IN}(x, y)$. This results in a corrected pixel value P(x, y) for each pixel in Row 0. It should be noted that steps S3 and S4 may actually be performed, pixel-by-pixel, in tandem. Once steps S3 and S4 are complete for the entire row it is determined, at step S6, if the method has reached the last row. If yes, the method ends. If no, the method continues to step S5, where the parameters for the Fx(x) function at the next row are determined, as described in more detail below. Then in step S7, the row number, n, is incremented by one. The method proceeds to step S3 for the next row. The Fx(x) function for Row n+1 $(Fx(x)_{n+1})$ is generated using the parameters $(a_{n+1}, b_{n+1}, c_{n+1}, d_{n+1}, e_{n+1})$ previously determined at step S5.

Steps S3 through S6 are repeated for each subsequent row of the pixel array. Steps S4 and S5 may occur simultaneously, for example, with the parameters for the Fx(x) function for Row 1 being calculated at the same time as the correction values for Row 0.

Step S5 is now described in more detail. At step S5, Fy(y) functions are used to determine parameters for generating the Fx(x) function for a row. Step S5 is performed once for each Row, 1 to n. The Fy(y) functions are piecewise-quadratic functions and are generated using the pre-stored values of the parameters for each Fy(y) function. There is one Fy(y) function, with parameters $p_{parameter}$, $q_{parameter}$, $r_{parameter}$, etc. to calculate each parameter of the Fx(x) functions. For example, there is an Fy(y) function used to calculate parameter "a" for each Fx(x) function. This Fy(y) function is evaluated at a particular row (y-value) to determine the "a" parameter for that particular row; another Fy(y) for "b," etc.

Since there are multiple Fy(y) functions, multiple sets of stored values are required. Typically, however, one calculating apparatus is sufficient to generate all of the Fy(y) functions. Since Fy(y) function values are updated only once per row scan time, there is plenty of time during the scan of a given row to determine, one after another, the updated values needed for the next row, for each of the Fy(y) functions. These values are stored until the scan of the next row, when they are used in the generation of the next Fx(x) function.

As previously described, the corrected pixel value P(x, y) is equal to the readout pixel value $P_{IN}(x, y)$ multiplied by the value of the correction function F(x, y) as shown in Equation (1) above. The "cross-term" $k_p*Fx(x)*Fy(y)$ in accordance with the method of the '454 application, requires the multiplication of the Fx(x) and the Fy(y) terms; no such multiplication is required in embodiments described herein. Instead, since the Fx(x) functions may be different for each row and are determined based on Fy(y) functions, the values of the Fx(x) functions determine the final gain value (along with the global offset, G) and there is no need for the cross-term or the multiplication step. This reduces the processing required.

The parameters for all of the Fy(y) functions include those for the first Fx(x) function, and are determined during camera calibration. The parameters are pre-stored in disclosed embodiments, or may be loaded before operation from a host or memory. Functions Fx(x) and Fy(y) may be stored and generated for each color channel (e.g., red, green, blue) separately to allow for color-specific correction.

The calibration procedure is briefly described, with reference to FIG. 2. For example purposes only, it is assumed that there are ten parameters required to specify an Fx(x) function. (The Fx(x) function may be described by any number of three or more parameters. Six parameters would be a practical minimum for most correction surfaces to be approximated.) First, a test image is captured and positional gain adjustment values are determined for each pixel in the pixel array. Then, an Fx(x) function is fit to each row of positional gain adjustment values and the ten parameters required to specify that Fx(x) function are recorded. FIG. 2 illustrates a table of the ten parameters ($a_{row}$ through $j_{row}$) for each Fx(x) corresponding to each row (1 to n) in the pixel array. A specific row in the table comprises parameters for the corresponding row in the pixel array. Reading across a row, there are values for the first parameter, the second parameter, etc., for the piecewise-quadratic function defining the positional gain adjustment values for that row. Reading down a column of the table, where the column is for the mth parameter, will provide the mth parameter for the Fx(x) function for each row. For example, the first entry in the fifth column is the fifth parameter for the Fx(x) function for the first row, shown surrounded by a dashed circle in FIG. 2. The second row, still in the fifth column, contains the fifth parameter for the Fx(x) function for the second row in the pixel array, shown surrounded by the smaller dashed rectangle in FIG. 2.

Rather than storing each of these parameters, for all of the Fx(x) functions, a mathematical representation of the parameters is stored. An Fy(y) function is determined for each column of parameters. This is done by fitting a piecewise-quadratic function through the column of parameters. For example, $Fy(y)_b$ would be a piecewise-quadratic representation of the $b_{row}$ parameters (for all the rows) which are shown surrounded by the larger dashed rectangle in FIG. 2. The parameters of this Fy(y) function are stored in memory. This is done for each parameter ($a_{row}$ through $j_{row}$) needed to generate the Fx(x) functions. The calibrated parameters must be available during operation. They may be calibrated once for many manufactured units having the same optics, or individually. The disclosed embodiments may contain the parameters permanently or they may be loaded from a host or memory before operation.

Once the parameters of the Fy(y) functions have been stored, the Fx(x) function for any desired row is generated during camera operation or, on a camera exported image, as follows (step S3). For each of the ten parameters needed to generate the Fx(x) function, the Fy(y) function is evaluated for that particular row. For example, for Row 3, Fy(y)$_a$, Fy(y)$_b$, etc. (through Fy(y)$_j$ in the FIG. 2 example), are evaluated at y equal to 3. This provides each of the parameters defining the Fx(x) function.

In the embodiments described herein, each Fy(y) function is generated in scan time, and updated for each row, so that the ten parameters needed for a row are calculated before that row is scanned out. While each row is being scanned out, another row's parameters are being calculated. Thus, the parameters needed to generate the Fx(x) function for any given row, after the first, are always available when needed, and are not permanently stored. As in the '454 application, Fy(y) is updated, row-by-row, and Fx(x) is updated pixel-by-pixel, from previous values, for efficient calculation.

It should be noted, of course, that more or fewer than ten parameters can be used to generate a piecewise-quadratic function used in described embodiments.

It should further be noted that embodiments are not limited to piecewise-quadratic functions. Embodiments may also implement piecewise-cubic and higher order piecewise functions, where not only would F(0), F' and F'' be permitted (as with piecewise-quadratic functions), but F''', F'''', etc. would be permitted as well, for both the Fx(x) and Fy(y) functions. Additionally, the Fx(x) functions and Fy(y) functions for a particular embodiment need not be of the same order, but different combinations of piecewise functions could be used. For example, the Fx(x) functions could be piecewise-quadratic while the Fy(y) functions could be piecewise-cubic. Further still, all Fy(y) functions, for a given embodiment need not be the same as each other. For example, the Fy(y) function for b$_{row}$ could be piecewise-quadratic while the Fy(y) function for g$_{row}$ is piecewise-cubic.

Figure 3:
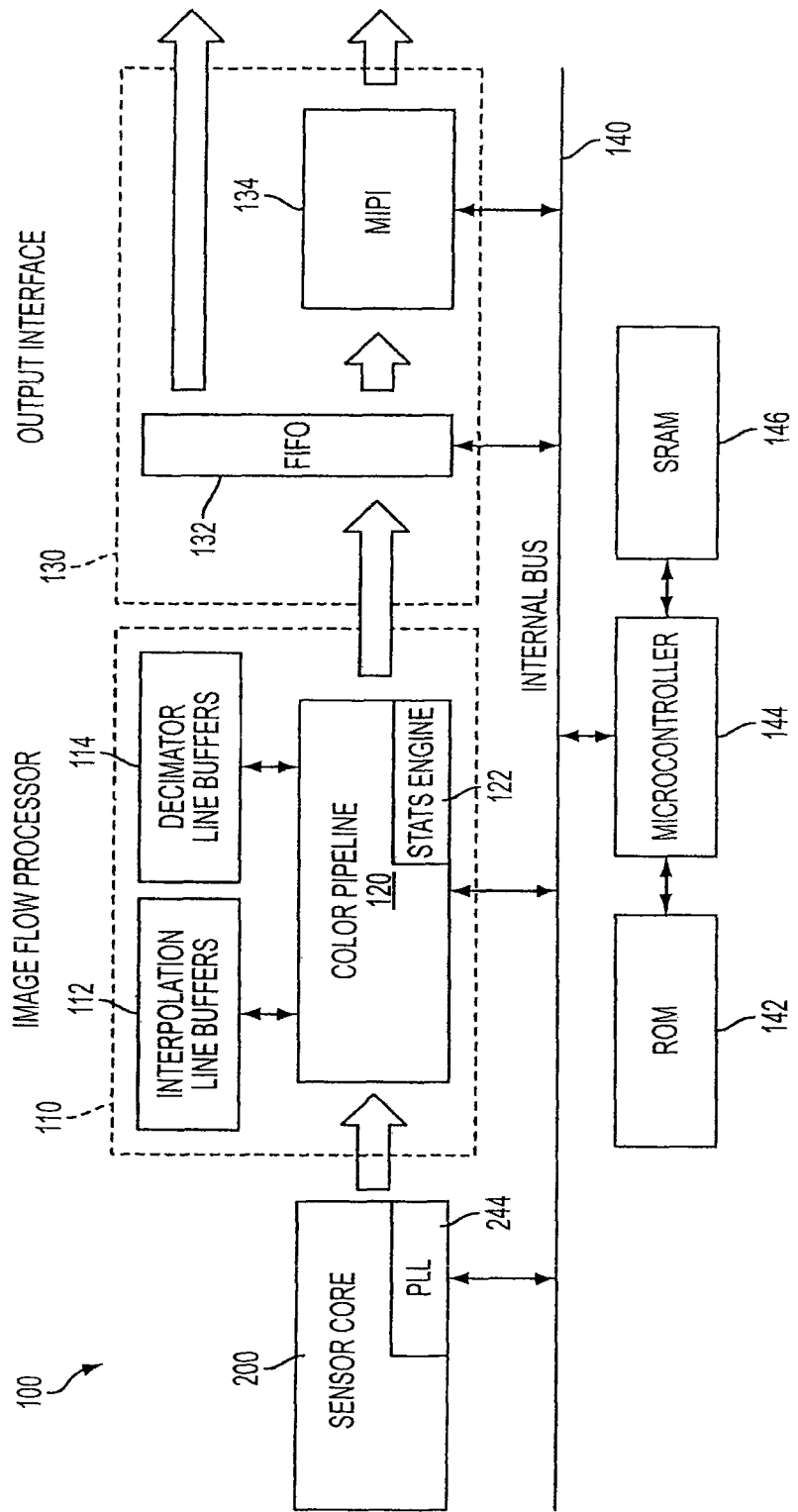
FIG. 3 is a block diagram of a system-on-a-chip image sensor construction implementing an embodiment disclosed herein.

FIG. 3 illustrates a block diagram of a system-on-a-chip (SOC) imager constructed in accordance with described embodiments. The system-on-a-chip may use any type of imager technology, CCD, CMOS, etc.

The imager 100 comprises a sensor core 200 that communicates with an image flow processor 110 that is connected to an output interface 130. A phase-locked loop (PLL) 244 is used as a clock for the sensor core 200. The image flow processor 110, which is responsible for image and color processing, includes interpolation line buffers 112, decimator line buffers 114, and a color processing pipeline 120. The color processing pipeline 120 includes, among other things, a statistics engine 122. One of the functions of the color processing pipeline 120 is the performance of positional gain adjustments in accordance with described embodiments.

The output interface 130 includes an output first-in-first-out (FIFO) parallel buffer 132 and a serial Mobile Industry Processing Interface (MIPI) output 134, particularly where the imager 100 is used in a camera in a mobile telephone environment. The user can select either a serial output or a parallel output by setting registers in a configuration register within the imager 100 chip. An internal bus 140 connects read only memory (ROM) 142, a microcontroller 144, and a static random access memory (SRAM) 146 to the sensor core 200, image flow processor 110, and output interface 130. The read only memory (ROM) 142 may serve as a storage location for one or more sets of parameters as described in greater detail above.

While embodiments have been described herein for use in positional gain adjustment for an acquired image, other embodiments may be used for other pixel corrections needed when array pixels are affected by spatial variations. Accordingly, the pixel correction method and apparatus described herein may be used for any type of spatially-varying pixel correction.

When employed in a video camera, pixel corrections may be performed in real time for each captured frame of the video image. The embodiments are not limited to in-camera processing and may be performed on image data exported by a camera.

Disclosed embodiments may be implemented as part of a pixel value processing pipeline 110, by a processor executing a program, by hardware circuits with processing pipeline 110, or by a combination of both, etc.

Disclosed embodiments may be implemented as part of a camera such as e.g., a digital still or video camera, or other image acquisition system, and also may be implemented as a stand-alone or plug-in software component for use in image processing applications. In such applications, the process can be implemented as computer instruction code contained on a storage medium for use in a computer image processing system.

Figure 4:
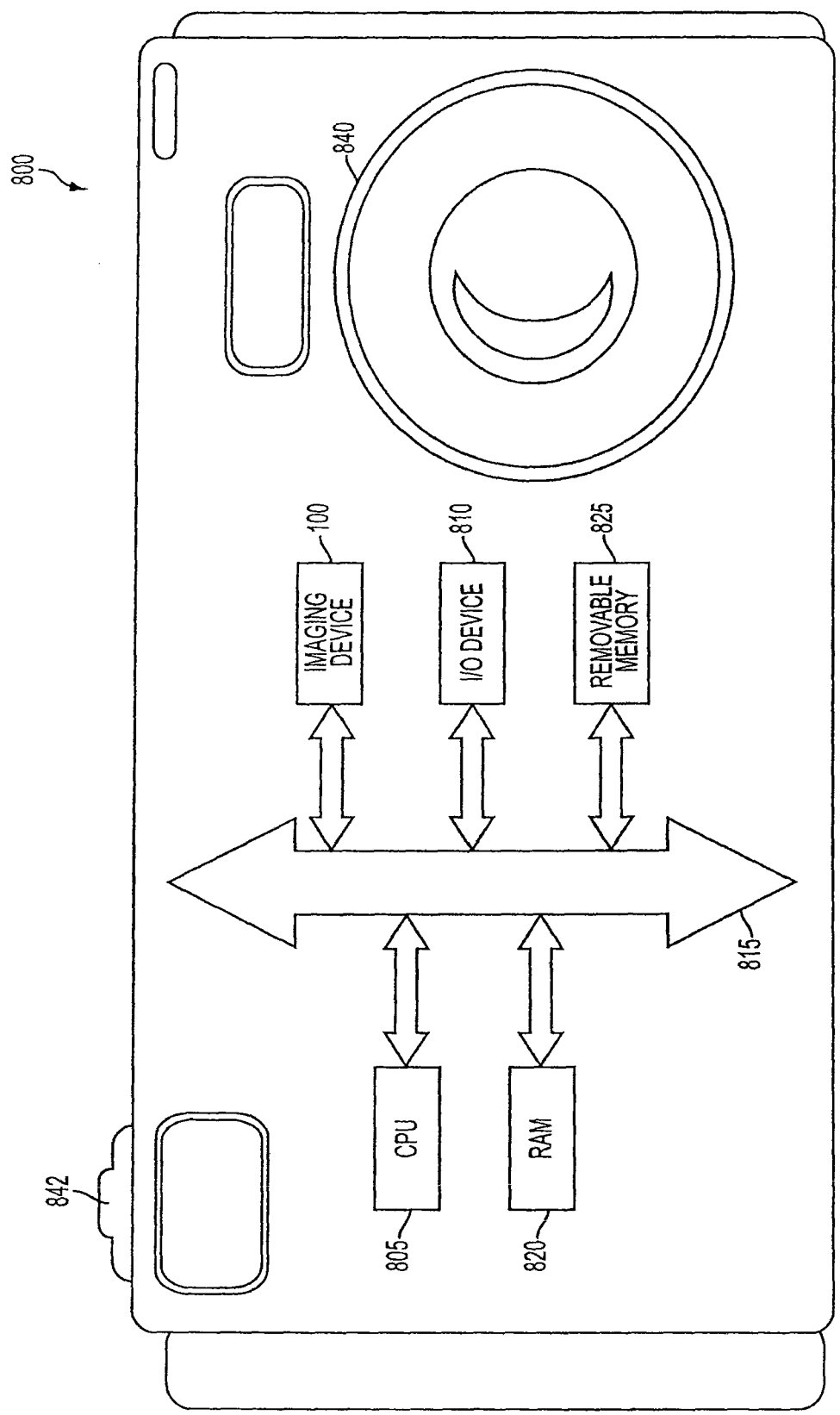
FIG. 4 depicts a camera system, for example, a digital still or video camera, which may employ an image sensor constructed in accordance with an embodiment disclosed herein.

FIG. 4 illustrates a processor system as part of, for example, or digital still or video camera system 800 employing a system-on-a-chip imager 100 as illustrated in FIG. 3, which imager 100 provides for positional gain adjustment and other pixel corrections as described above. The processing system includes a processor 805 (shown as a CPU) which implements system, e.g. camera 800, functions and also controls image flow. The processor 805 is coupled with other elements of the system, including random access memory 820, removable memory 825 such as a flash or disc memory, one or more input/out devices 810 for entering data or displaying data and/or images and imager 100 through bus 815 which may be one or more busses or bridges linking the processor system components. The imager 100 receives light corresponding to a captured image through lens 840 when a shutter release button 842 is depressed.

While described embodiments have been described in detail, it should be readily understood that the embodiments are not limited to those disclosed. Rather the embodiments can be modified to incorporate any number of variations, alterations, substitutions or equivalent arrangements not heretofore described.

What is claimed as new and desired to be protected by Letters Patent of the United States is:

1. An imaging device comprising:
    a pixel array, the pixel array outputting a plurality of pixel values; and
    an image processing unit coupled to the pixel array, the image processing unit being operable to correct a responsiveness of pixels in the array by applying respective positional gain adjustment values to the pixel values,
    wherein a positional gain adjustment value for a particular pixel value associated with a first row of pixels is the value of a first generic piecewise-quadratic correction function as defined by a first set of stored parameters and a positional gain adjustment value for a particular pixel value associated with subsequent rows of pixels is the value of the first generic piecewise-quadratic correction function as defined by a set of calculated parameters, the sets of calculated parameters defining the first generic piecewise-quadratic correction function being determined by a second generic piecewise-quadratic function as defined, for each calculated parameter defining the first generic piecewise-quadratic function, by a respective one of a plurality of second sets of stored parameters.

2. The imaging device of claim 1, wherein a particular set of calculated parameters defining the first generic piecewise-quadratic correction function for determining the positional gain adjustment value for a pixel value corresponding to a particular pixel in the pixel array is the set of calculated parameters corresponding to a row in the pixel array in which the particular pixel is located.

3. The imaging device of claim 1, wherein the respective sets of calculated parameters for the first generic piecewise-quadratic correction function are determined in real time.

4. The imaging device of claim 1, further comprising a memory device, wherein the plurality of sets of stored parameters are stored in the memory device.

5. An imaging device comprising:
  a pixel array, the pixel array outputting a plurality of pixel values;
  a processor coupled to the pixel array for correcting responsiveness of pixels in the array by applying respective pixel correction values to the pixel values, the processor being operable to determine, in real time, a pixel correction value for a particular pixel value as the value of a first generic piecewise-quadratic correction function as defined by a respective set of calculated parameters corresponding to the row of the particular pixel value, wherein the respective set of calculated parameters for the first generic piecewise-quadratic correction function are determined using a second generic piecewise-quadratic correction function as defined, for each calculated parameter defining the first generic piecewise-quadratic function, by a respective one of a plurality of sets of stored parameters; and
  a memory device, wherein the plurality sets of stored parameters defining the second generic piecewise-quadratic correction function are stored in the memory device.

6. An imaging device, comprising:
  a pixel array; and
  a processor coupled to the pixel array for applying correction factors to pixel values read out from the pixel array, the processor being operable to determine and apply correction factors based on a first generic piecewise-quadratic correction function as defined by a first set of stored parameters for pixels in a first row of the pixel array and as defined by respective sets of calculated parameters for pixels in each subsequent row of the pixel array,
  wherein the processor determines a correction factor corresponding to a particular pixel value using a corresponding set of stored or calculated parameters to determine the first generic piecewise-quadratic correction function,
  wherein the sets of calculated parameters for defining the first generic piecewise-quadratic function for each subsequent row are determined by a second generic piecewise-quadratic correction function as defined, for each calculated parameter defining the first piecewise-quadratic function, by a respective one of a plurality of second sets of stored parameters.

7. The imaging device of claim 6, wherein the processor determines the correction factors corresponding to all pixels in the pixel array, and wherein the correction factors are determined and applied row by row across the pixel array.

8. The imaging device of claim 7, where a set of calculated parameters corresponding to a row subsequent to a current row are determined at the same time as the correction factors are applied to pixel values of pixels in the current row.

9. The imaging device of claim 6, wherein the correction factors are determined and applied in real time.

10. An imaging device, comprising:
  a pixel array; and
  a processor coupled to the pixel array for applying correction factors to pixel values read out from the pixel array, the processor being operable to determine and apply correction factors, wherein the correction factors are determined in accordance with: $F(x, y)=Fx(x)+G$, wherein $F(x, y)$ is the correction factor, $Fx(x)$ is a first generic piecewise-quadratic correction function, and G is a universal gain value, and
  wherein a specific $Fx(x)$ function is defined for each row in the pixel array in terms of multiple specific $Fy(y)$ functions, wherein $Fy(y)$ is a second generic piecewise-quadratic correction function, and each specific $Fy(y)$ is defined by a set of stored parameters.

11. An image signal processor operable to correct a responsiveness of pixel signals by applying respective positional gain adjustment values to pixel values corresponding to the pixel signals, wherein a positional gain adjustment value for a particular pixel value is the value of a first generic piecewise-quadratic correction function as defined by respective sets of calculated parameters corresponding to the particular pixel value, wherein the respective sets of calculated parameters defining the first generic piecewise-quadratic correction function are determined by a second generic piecewise-quadratic correction function as defined, for each calculated parameter defining the first generic piecewise-quadratic correction function, by a respective one of a plurality of sets of stored parameters.

12. The image signal processor of claim 11, wherein the respective set of calculated parameters defining the first generic piecewise-quadratic correction function for determining the positional gain adjustment value for a pixel value corresponding to a particular pixel signal is the set of calculated parameters corresponding to a row in a pixel array in which the particular pixel signal is located.

13. The image signal processor of claim 11, wherein the respective sets of calculated parameters for the first generic piecewise-quadratic correction function are determined in real time.

14. A non-transitory computer readable storage medium comprising:
  a set of instructions stored on the medium and executable on a processor to perform the acts of:
    determining corrected pixel values associated with a first row of pixels using a first generic piecewise-quadratic correction function as defined by a first set of stored parameters; and
    determining corrected pixel values associated with each subsequent row of pixels using the first generic piecewise-quadratic correction function as defined for each subsequent row by respective sets of calculated parameters, wherein the sets of calculated parameters defining the first generic piecewise-quadratic correction function for each subsequent row are determined by a second generic piecewise-quadratic correction function as defined, for each calculated parameter defining the first generic piecewise-quadratic function, by a respective one of a plurality of second sets of stored parameters.

15. The non-transitory computer readable storage medium of claim 14, wherein a number of second sets of stored parameters for defining the second generic piecewise-quadratic correction function is determined by a number of calculated parameters defining the first generic piecewise-quadratic correction function, which corresponds to a number of piecewise-segments of the first generic piecewise-quadratic correction function.

16. The non-transitory computer readable storage medium of claim 15, wherein each of the plurality of second sets of stored parameters corresponds to a calculated parameter for a particular piecewise-segment of the first generic piecewise-quadratic correction function.

17. The non-transitory computer readable storage medium of claim 14, wherein the respective sets of calculated parameters defining the first generic the piecewise-quadratic correction function are determined in real time and are not concurrently stored in memory.

18. The non-transitory computer readable storage medium of claim 14, wherein the respective sets of calculated parameters defining the first generic piecewise-quadratic correction function differ between rows.

19. The non-transitory computer readable storage medium of claim 14, wherein the pixel correction values are positional gain adjustment values.

20. A digital camera comprising:
a lens;
a pixel array for capturing an image received through the lens; and
an image processing circuit which is operable to determine a set of pixel correction values for use in correcting pixel values corresponding to pixels of a captured image and to correct the pixel values for a captured image using the determined set of pixel, correction values, wherein the pixel correction values are determined based on a first generic piecewise-quadratic correction function as defined by respective sets of calculated parameters,
wherein the image processing circuit determines a pixel correction value corresponding to a particular pixel value using the respective set of calculated parameters to determine the value of the first generic piecewise-quadratic correction function, the respective sets of calculated parameters being determined by a second generic piecewise-quadratic correction function as defined, for each calculated parameter defining the first generic piecewise-quadratic correction function, by a respective one of a plurality of sets of stored parameters.

21. The digital camera of claim 20, wherein the pixel correction values are positional gain adjustment values.

22. An image processing system comprising:
a processor; and
an imaging system coupled to the processor, the imaging system comprising:
a pixel array, the pixel array outputting a plurality of pixel values; and
an image processing circuit for processing the plurality of pixel values, the image processing circuit being operable to determine and apply respective pixel correction values to the pixel values,
wherein a pixel correction value for a particular pixel value is the value of a first generic piecewise-quadratic correction function as defined by a respective set of calculated parameters corresponding to the particular pixel value,
wherein the pixel value processing circuit further comprises means for determining the respective sets of calculated parameters for the first generic piecewise-quadratic correction function using a second generic piecewise-quadratic correction function as defined, for each calculated parameter defining the first generic piecewise-quadratic correction function, by a respective one of a plurality of sets of stored parameters.

23. The image processing system of claim 22, wherein the respective sets of calculated parameters for the first generic piecewise-quadratic correction function are determined in real time.

24. The image processing system of claim 22, further comprising a memory device, wherein the plurality of sets of stored parameters defining the second generic piecewise-quadratic correction function are stored in the memory device.

* * * * *

UNITED STATES PATENT AND TRADEMARK OFFICE
CERTIFICATE OF CORRECTION

PATENT NO. : 8,620,102 B2  
APPLICATION NO. : 13/214026  
DATED : December 31, 2013  
INVENTOR(S) : Gregory Michael Hunter Page 1 of 1

It is certified that error appears in the above-identified patent and that said Letters Patent is hereby corrected as shown below:

In the Claims:

In column 9, line 33, in Claim 5, after "plurality" insert -- of --.

In column 11, line 11, in Claim 17, after "generic" delete "the".

In column 11, line 29, in Claim 20, delete "pixel," and insert -- pixel --, therefor.

Signed and Sealed this  
Fifteenth Day of April, 2014

Michelle K. Lee  
*Deputy Director of the United States Patent and Trademark Office*